No. 814,202. PATENTED MAR. 6, 1906.
J. J. HAHN.
DOOR FOR GRAIN CARS.
APPLICATION FILED MAY 3, 1905.
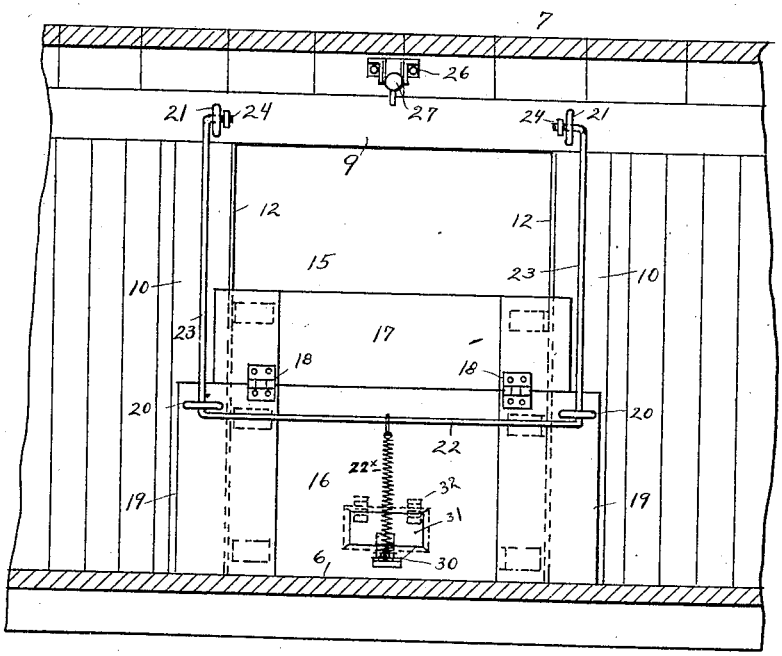
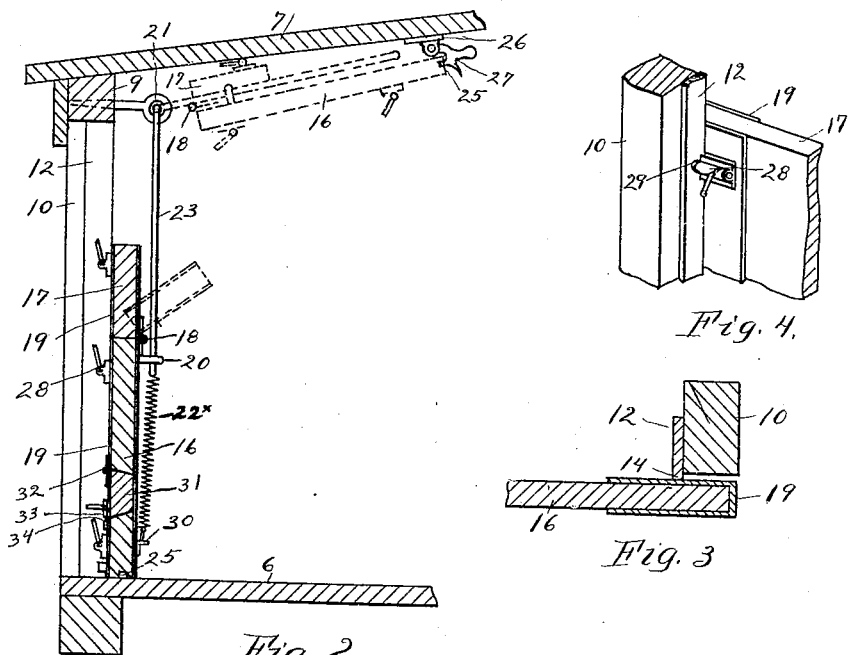
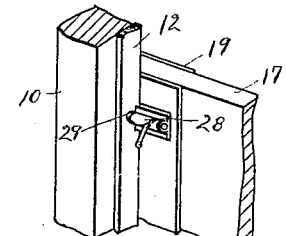
Witnesses
S. L. C. Hasson
Annie L. Greer
Inventor
John J. Hahn
By Rich'd A. Manning, Atty.

UNITED STATES PATENT OFFICE.

JOHN J. HAHN, OF KANSAS CITY, MISSOURI.

DOOR FOR GRAIN-CARS.

No. 814,202.  Specification of Letters Patent.  Patented March 6, 1906.

Application filed May 3, 1905. Serial No. 258,655.

*To all whom it may concern:*

Be it known that I, JOHN J. HAHN, a citizen of the United States of America, residing at Kansas City, in the county of Jackson and State of Missouri, have invented certain new and useful Improvements in Doors for Grain-Cars; and I do hereby declare that the following is a full, clear, and exact description of the invention, such as will enable others to make and use the same, reference being had to the accompanying drawings, forming a part of this specification.

The object of my invention is to enable a grain-door to be easily raised in position to release the grain when resisting the outward pressure of the grain.

The invention consists in the novel construction and combination of parts, such as will be first fully described, and specifically pointed out in the claims.

In the drawings, Figure 1 is a broken portion of one side of a car, taken from within the car and showing the floor and roof in longitudinal section, also showing the door-jambs, the grain-holding door, and the novel suspension and door-securing devices. Fig. 2 is a vertical sectional view taken at right angles to and upon the line $x\ x$ of Fig. 1. Fig. 3 is a horizontal sectional view of portions of the door and jamb, showing the antifriction-plates. Fig. 4 is a detail broken view of the door and jamb, showing the outer surface of the door and the door-bolts.

Similar numerals of reference indicate corresponding parts in all the figures of the drawings.

Referring to the drawings, 5 indicates the side wall of a car commonly employed for the transportation of grain and like commodities, and 6 and 7 indicate the floor and roof of the car, respectively.

8 indicates the opening in the sides of the car for the car-door and which is of the usual width and extends from the floor 6 upwardly to the plate 9, upon which the roof of the car is supported.

10 10 are the door posts or jambs, which form the sides to the opening 8 and extend from the floor 6 to the lower surface of the plate 9.

Upon the surface of the jambs, opposite each other in position, are vertical antifriction guide-plates 12 12. These plates extend upwardly from the floor 6 to the plate 9 and a slight distance inwardly from the inner surface of the jamb, so as to form a bearing-surface 14 for the door, as seen in Fig. 3, out of contact with the jamb, as further described.

15 indicates the slidable door for holding the grain or other commodity within the car. The door for convenience is in two parts, as seen in Figs. 1 and 2, the lower portion 16 extending upwardly from the floor about one-half the distance upwardly in the direction of the roof 7 of the car, and the outer surfaces of the ends of the door extend to a position opposite the inner surfaces of the door-posts. The upper portion 17 of the door is hinged by the hinges 18 to the inner surface of the lower portion 16 of the door. This portion of the door extends upwardly a short distance above the upper surface of the portion 16 and from the floor upwardly about two-thirds the distance of the opening 8 in the direction of plate 9. The hinged portion 17 of the door is shorter in length than the portion 16, so that the inner surface of the ends extend over one-third the surface of the door-posts. Upon the outer surface and at the ends of the portions 16 and 17 of the door are flat plates 19, which extend around the ends of the said portions of the door and a short distance upon the inner surface of the door, said outer surfaces of the plates 19 coming into contact with the surface of the antifriction guide-plates 12, as seen in Fig. 3.

Secured to the upper ends of plates 19 on the inner surface of the lower portion 16 of the door are loops or staples 20, which form guide-bearings and are made of considerable length. Secured to the inner surface of the plate 9 are the eyebolts 21 21.

22 indicates the swinging suspension device or links, comprising a suspension-rod, a portion of which between the ends extends horizontally upon the inner surface of the portion 16 of the door, the ends 23 23 of said rod being bent at right angles and extended upwardly through the loops 20 20 on said door, thence to the eyebolts 21 on the plate 9, and the terminal portions of said rod are bent at right angles and extended through the eyebolts in the direction of each other, these ends being screw-threaded. Upon the screw-threaded ends of the said rods and on the inner side of the eyebolts are the nuts 24. With the link 22 is connected at one end a coiled spring $23^\times$, the other end of which spring is also connected with a lug 30 on the lower portion of the door.

In the lower surface of the portion 16 of the door at a point intermediate the ends is a notch 25. On the inner side of the roof 7 of the car is secured a plate 26, to which is pivoted a gravity latch or catch 27, the engaging end of which latch enters the notch 25 in the lower surface of the portion 16 of the door when elevated in position.

In order to secure the door to the jamb, sliding rotary bolts 28 are secured to the outer surface and ends of the upper and lower portions of the door, as seen in Fig. 4, which enter openings 29 in the plates 12 on the surfaces of the jamb or door-posts 10 opposite to each other. In the lower portion 16 of the door is a small rectangular-shaped opening which is closed by a valve 31, hinged to the outer surface of the door by the hinges 32. The free end of the valve is secured by the bolts 33 to the keepers 34, which bolts are the same as the bolts securing the door 16 to the door-jamb.

In the conveyance of grain the portions 16 and 17 of the door are in position as seen in Figs. 1 and 2, the door-bolts securing the doors to the plate 12 on the door posts or jambs, the inner surface of the plate 12 and the plates 19 on the door being in contact, thus preventing escape of the grain from any part of the opening 8 closed by the doors. In opening the doors for the release of the grain the sliding bolts 28 are first released from the openings in plates 12. A lever is then applied to the lug 30 and the outer surface of the lower portion 16 of the door, and the door moves upwardly with decreased resistance, owing to the narrow surface of the plate 12 upon which the outward pressure of the door is exerted by the grain, and the door moves upwardly sufficient to allow the escape of a quantity of grain to release the pressure. The upper portion 17 of the door is then moved inwardly upon the hinges and being shorter in length than the portion 16 passes within the rods 23 and rests upon the inner surface of the said portion 16 of the door. The portion 16 of the door is then moved upwardly on the rods 23, the resistance being decreased by the spring until the upper surface approaches the eyebolts. The lower portion of the door is swung upon the rods, carrying the rods with it, and moved upwardly toward the roof 7, and the gravity-catch 27 engages with the notch 25 in the lower surface of said portion of the door, the portions 23 of the rod moving telescopically and the horizontal portion of the rod as the slack is taken up bearing upon the door. In this position the door is out of the way, and the car may be loaded with lumber or other commodities without interference until needed. The length of the staples 20 permit a free movement laterally of the door and also enables the door to be raised without binding. Should the pressure on the grain-door require partial discharge of the grain adjacent thereto in order to start the initial movement of the slidable grain-door upward, the valve 31 in the door 16 is opened and a sufficient quantity of grain is discharged through the opening 30, after which the valve is closed.

It is obvious that the slidable door may be employed for other than car-door openings and for smaller openings, such as for the transoms of doors, when the upper part may be employed and supported in like manner as the lower part, the guiding devices on the doors of suitable length, and such modifications employed as are within the scope of the invention.

Having fully described my invention, what I now claim as new, and desire to secure by Letters Patent, is—

1. The combination with a slidable door and vertical suspension-rods therefor and guiding devices upon the door adapted to receive telescopically said rods of a spring connected at one end with the lower ends of said rods and at the other end with the lower portion of the said door.

2. In a car having a door-opening in the walls, the combination with the wall-plate of suspension-rods pivotally connected therewith at their upper ends, a slidable door to said opening, a lug upon the inner surface and near the lower edge of said door, guiding devices on the inner surface of the door within which the said rods are telescopically extended and transverse portions of said rods connecting their lower ends with each other, a self-acting catch within the car adapted to engage with the lower portion of said door and a coiled spring one end of which is connected with the transverse portion of said rods and the other end with the lug near the lower edge of said door.

JOHN J. HAHN.

Witnesses:
 GLEN SHERMAN,
 WM. WALTER BRADY.